United States Patent

[11] 3,607,540

[72] Inventor Leon E. Hoogstoel
 Schenectady, N.Y.
[21] Appl. No. 736,170
[22] Filed June 11, 1968
[45] Patented Sept. 21, 1971
[73] Assignee Norton Company
 Troy, N.Y.

[54] METHOD OF APPLYING PRESSURE-SENSITIVE SHEETING
 9 Claims, 2 Drawing Figs.

[52] U.S. Cl. ................................................ 156/289,
 156/310, 156/71
[51] Int. Cl. ............................................. B32b 31/12
[50] Field of Search ........................................... 156/71,
 310; 152/89, 289

[56] References Cited
UNITED STATES PATENTS

| | | | |
|---|---|---|---|
| 2,291,800 | 8/1942 | Drake............................ | 156/71 |
| 2,346,644 | 4/1944 | Bauer et al..................... | 156/310 |
| 3,103,858 | 9/1963 | Lauren.......................... | 156/71 |
| 3,288,664 | 11/1966 | Hoppe........................... | 156/310 |

*Primary Examiner*—Reuben Epstein
*Attorney*—Hugh E. Smith

ABSTRACT: A porous surface to which a pressure-sensitive adhesive coated material is to be applied is first wet with a liquid to provide a temporary barrier film. The pressure-sensitive adhesive sheet material is then applied to the surface and because of such temporary liquid barrier film can be slid over and around on the porous surface to position it accurately in place. The temporary barrier film disappears by means of evaporation or absorption of the liquid into the porous substrate and the sheet material then becomes firmly affixed to the porous surface.

PATENTED SEP 21 1971         3,607,540

INVENTOR.
LEON E. HOOGSTOEL
BY Hugh E. Smith
ATTORNEY

METHOD OF APPLYING PRESSURE-SENSITIVE SHEETING

There has been an increasing trend toward the use of "prepasted" wallpaper or other decorative wall coverings in an effort to get away from the need for the wallpaper paste pot and associated gear used for many years in the hanging of paper. This trend has been expedited by the do-it-yourself promotional campaigns put on by hardware and lumber dealers to advance the sale of their various products.

The "prepasted" sheetings using water-remoistenable adhesives have suffered from one of the same defects as the original types of wall materials, i.e., the sheet must be wet by the user and becomes limp, hard to handle and subject to tearing in the same way the older sheets did when the paste was applied. An obvious improvement would be to use an adhesive which does not require wetting and there have been a number of products of this type utilizing a pressure-sensitive adhesive similar to the adhesive used in masking or cellophane tapes.

One major drawback with the use of pressure-sensitive adhesive sheeting is the "quick-stick" nature of the pressure-sensitive adhesive. Once the adhesive touches a surface, it adheres tenaciously and cannot be slid or moved without danger of tearing or wrinkling the backing. This becomes a very serious problem with wall covering since joints must be made and many times patterns must be aligned.

The present invention provides a method which permits the use of aggressive pressure-sensitive adhesive coated sheetings by providing a way in which such sheeting can be applied to a surface and then shifted on such surface, easily and without tearing or wrinkling, to permit smooth joint formation or pattern alignment. This method consists essentially in the formation of a temporary barrier layer which has low cohesive strength and can be sheared easily as by movement of an adhesive surface in contact therewith. This barrier layer is interposed between the pressure-sensitive sheeting and the wall or other substrate to which the sheeting is to be applied. The layer is of such a nature that it will evaporate or be absorbed into the wall surface on which it is applied in a short period of time and thus permit the normal contact of the pressure-sensitive adhesive layer with the substrate.

DESCRIPTION OF THE DRAWINGS

Referring to FIG. 1, the wall or other surface 10 to which a desired pressure-sensitive adhesive sheet material is to be applied is first treated, as described below, to provide a temporary liquid barrier layer 11 thereon. The decorative or other pressure sensitive adhesive sheet material 12 having a layer 13 of tacky pressure-sensitive adhesive affixed thereto is positioned as shown with the adhesive layer 13 against the temporary barrier layer 11 and spaced from the surface 10 by such barrier layer. In this association, sheet 12 can be slid over barrier layer 11 to adjust the position of sheet 12 relative to surface 10. Upon standing for a short period of time, the barrier layer 11 disappears (by evaporation or absorption into surface 10) and the arrangement becomes as illustrated in FIG. 2 with the adhesive layer 13 directly in contact with the surface 10. At this point the sheeting 12 can no longer be shifted relative to surface 10 and is adhered thereto in a fixed relationship.

Figure 1:
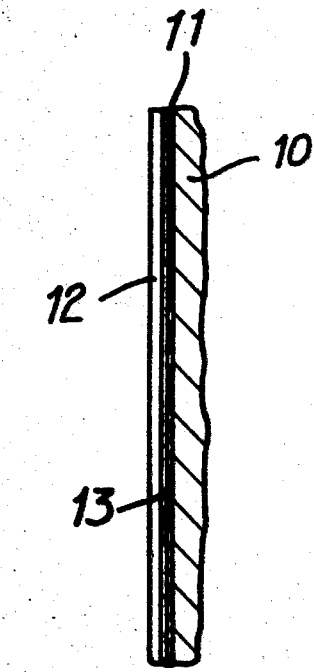
FIG. 1 is a side elevation showing a sheet of pressure-sensitive adhesive coated material being applied to a surface in accordance with the present method.
Figure 2:
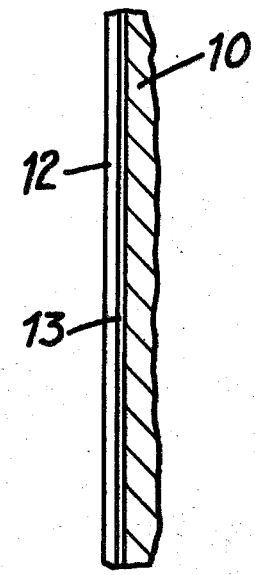
FIG. 2 is a side elevation showing the sheet and surface after application is complete.

The pressure-sensitive adhesives useful in the present invention may be any of those known to the art. Typical adhesive formulations may range from the rubber-resin type exemplified by U.S. Pat. No. 2,410,053 through acrylic types such as illustrated in U.S. Pat. No. 2,884,126 to siloxane types such as are disclosed in U.S. Pat. No. 2,814,601. No criticality in the type of pressure-sensitive adhesive exists so long as it is normally tacky and has a good adhesion to the backing used.

The backing likewise is not critical to the present method. Decorative materials of all types such as paper, vinyl or other organic film, metal foils, laminates of these or with other flexible substrates are all useful. Generally, it is preferred that the substrate be flexible but relatively inflexible backings such as plywood or particle board sheeting may be used if desired. Where desirable, a suitable release agent may be applied to the backing or a liner may be used to cover the adhesive layer prior to use.

The wall or substrate to which the pressure-sensitive sheeting is to be applied may likewise vary considerably as to the materials from which it is made. Preferably, the substrate is porous to some degree so that the liquid barrier layer will absorb into it in a relatively short span of time, e.g., three to five minutes. Normal wall surfaces such as wood, plaster or the like are of this type. However, even nonporous surfaces have been found to be satisfactory since sufficient space generally exists for evaporation to take place, although this may require a longer period, e.g. several days.

The barrier layer formed according to the present method must meet several criteria. It must be liquid, must provide a wet film or layer of poor cohesive strength relative to the cohesive strength of a pressure-sensitive adhesive, and must be capable of dissipating through either relatively rapid evaporation or absorption by the substrate to which it is applied. It must also be a nonsolvent for the particular adhesive mass used on the sheeting to be applied. In its simplest form the barrier layer may be formed of water. Most pressure-sensitive adhesives are organic solvent based and are insoluble in water. Such adhesives will slide readily on a water film. Frequently, the addition of a small amount of a wetting agent to the water used in forming the barrier layer is desirable. Suitable wetting agents for use with rubber-based adhesive sheetings, for example, include sodium lauryl sulfate and trimethyl benzyl ammonium chloride. Other fluids with low cohesive strength such as glycerin or ethylene glycol may be used where such fluids are not solvents for the particular adhesive system used on the sheeting to be applied.

I claim:

1. Method of applying a sheet material having a pressure-sensitive adhesive layer on one surface thereof to a substrate which involves the following procedural steps:
   a. forming on the surface of the substrate to which the pressure-sensitive adhesive coated sheet material is to be applied a temporary liquid barrier layer, said barrier layer being a nonsolvent for the pressure-sensitive adhesive layer and being of poor cohesive strength relative to the adhesive layer;
   b. applying said sheet material to, with the pressure-sensitive adhesive surface in contact with, said liquid barrier layer;
   c. sliding said sheet material whereby said barrier layer shears and permits the sheet material to be properly positioned relative to said substrate; and
   d. keeping the sheet material in said proper position while the temporary liquid barrier layer dissipates by evaporation or absorption thereby fixing said sheet material in position relative to said substrate, said pressure-sensitive adhesive surface being in direct contact with the substrate.

2. Method of applying a pressure-sensitive adhesive sheet material according to claim 1 wherein said liquid barrier layer comprises water.

3. Method of applying a pressure-sensitive adhesive sheet material according to claim 2 wherein said barrier layer further includes a wetting agent.

4. Method of applying a pressure-sensitive adhesive sheet material according to claim 3 wherein said pressure-sensitive adhesive is a rubber-based adhesive.

5. Method of applying a pressure-sensitive adhesive sheet material according to claim 4 wherein said substrate is sufficiently porous to permit the barrier layer to dissipate by absorption.

6. Method of applying a pressure-sensitive adhesive sheet material according to claim 5 wherein the absorption will occur in less than 5 minutes.

7. Method of applying a pressure-sensitive adhesive sheet material according to claim 6 wherein said wetting agent is sodium lauryl sulfate.

8. Method of applying a pressure-sensitive adhesive sheet material according to claim 6 wherein said wetting agent is trimethyl benzyl ammonium chloride.

9. Method of applying a pressure-sensitive adhesive sheet material according to claim 1 wherein the barrier layer dissipates by evaporation.